US007973627B2

(12) United States Patent
Yamagata et al.

(10) Patent No.: US 7,973,627 B2
(45) Date of Patent: Jul. 5, 2011

(54) SOLENOID ACTUATOR

(75) Inventors: Hideki Yamagata, Sagamihara (JP); Mamoru Hosogai, Sagamihara (JP); Hideki Tsuchiya, Sagamihara (JP); Yoshiharu Miya, Sagamihara (JP); Tomoyuki Fujita, Kani (JP); Koichiro Akatsuka, Gifu (JP); Kenji Yazaki, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 99 days.

(21) Appl. No.: 12/591,033

(22) Filed: Nov. 5, 2009

(65) Prior Publication Data

US 2010/0109825 A1 May 6, 2010

(30) Foreign Application Priority Data

Nov. 6, 2008 (JP) ................................. 2008-285371

(51) Int. Cl.
*H01F 3/00* (2006.01)
*H01F 7/00* (2006.01)
*F16K 31/02* (2006.01)

(52) U.S. Cl. ........ 335/255; 335/219; 335/220; 335/261; 335/279; 335/281; 335/296; 335/297; 251/129.15

(58) Field of Classification Search .................. 335/219, 335/220, 255, 261, 279, 281, 296, 297; 251/129.15
See application file for complete search history.

(56) References Cited

U.S. PATENT DOCUMENTS

| | | | | |
|---|---|---|---|---|
| 3,851,285 | A * | 11/1974 | Rothfuss et al. | 335/262 |
| 4,694,270 | A * | 9/1987 | Ichihashi | 335/260 |
| 5,402,093 | A * | 3/1995 | Gibas et al. | 335/261 |
| 5,856,771 | A * | 1/1999 | Nippert | 335/262 |
| 2003/0136931 | A1* | 7/2003 | Watanabe et al. | 251/129.15 |
| 2005/0068136 | A1* | 3/2005 | Schempp et al. | 335/220 |
| 2008/0180200 | A1* | 7/2008 | Gamble | 335/234 |
| 2009/0050829 | A1* | 2/2009 | Haynes et al. | 251/129.02 |

FOREIGN PATENT DOCUMENTS

JP 2001-317653 A 11/2001

* cited by examiner

*Primary Examiner* — Anh T Mai
*Assistant Examiner* — Mohamad A Musleh
(74) *Attorney, Agent, or Firm* — Rabin & Berdo, P.C.

(57) ABSTRACT

A solenoid actuator (1) attached to a hydraulic equipment comprises a shaft (5) connected to the hydraulic equipment, a plunger (4) fixed to the shaft (5), a coil (12) which magnetically drives the plunger (4), and a first bearing (7) and a second bearing (8) supporting the shaft (5) on both sides of the plunger (4). A plunger front chamber (74) is formed between the first bearing (7) and the plunger (4), a plunger rear chamber (75) is formed between the plunger (4) and the second bearing (8), and a second bearing rear chamber (76) is formed on the opposite side of the second bearing (8) to the plunger rear chamber (75). To secure an oil flow between these chambers, a plunger exterior oil passage (63), a second bearing oil passage (64), and a shaft-penetrating oil passage (65) are provided, thereby realizing a preferable balance between oil pressures acting on the second bearing (8).

10 Claims, 6 Drawing Sheets

SOLENOID ACTUATOR

FIELD OF THE INVENTION

This invention relates to a solenoid actuator which drives a shaft axially using a magnetic force created by a solenoid.

BACKGROUND OF THE INVENTION

In a solenoid actuator which operates hydraulic equipment through the linear motion of a shaft introduces, for example, working oil in the hydraulic equipment into the actuator to lubricate bearings supporting the shaft or realize a preferable balance of pressures acting on a front face and a rear face of the bearings.

When working oil containing a contaminant such as abrasion powder generated in the hydraulic equipment is introduced into the solenoid actuator, the contaminant tends to be deposited in a strong magnetic field portion of the actuator. The contaminant deposited in the strong magnetic field portion shaft adversely affects the operation of the solenoid actuator by weakening a thrust which the solenoid exerts on the shaft or increasing a sliding resistance of the shaft with respect to the bearings.

JP2001-317653A, published by the Japan Paten Office in 2001, proposes a seal structure to prevent the contaminant from invading a solenoid actuator. The solenoid actuator is configured to displace a plunger fixed to a shaft by a magnetic force of a solenoid together with the shaft. The shaft is supported by bearings disposed on a front side and a rear side of the plunger so as to be free to slide axially. By providing ring-shaped seal members on an inner side of the bearings with respect to an axial direction of the shaft, the contaminant is prevented from invading a plunger chamber formed between the bearings.

In the interior of the actuator, a rear chamber is formed on a rear side of one of the bearings which is located farther from the hydraulic equipment. A shaft-penetrating passage which introduces working oil from the hydraulic equipment to the rear chamber is formed through the shaft.

SUMMARY OF THE INVENTION

Since working oil communication between the rear chamber and the plunger chamber is blocked by the seal member in this solenoid actuator, a pressure difference is created between the rear chamber and the plunger chamber due to pressure variation in the hydraulic equipment. When this pressure difference becomes large, the bearing may be shifted axially and become unable to support the shaft appropriately.

It is therefore an object of this invention to prevent a contaminant deposit from forming in a solenoid actuator while keeping an optimum balance of pressures acting on a bearing of a solenoid actuator.

To achieve the above object, this invention provides a solenoid actuator attached to hydraulic equipment. The actuator comprises a shaft having a center axis and connected to the hydraulic equipment, a plunger made of magnetic material and fixed to the shaft, a coil which magnetically drives the plunger in a direction of the center axis, and a first bearing and a second bearing which support the shaft. The first bearing and the second bearing are located on either side of the plunger along the center axis. The first bearing is nearer to the hydraulic equipment than the second bearing.

The actuator further comprises a plunger front chamber formed between the first bearing and the plunger, a plunger rear chamber formed between the plunger and the second bearing, a plunger exterior oil passage formed on the outside of the plunger to connect the plunger front chamber to the plunger rear chamber, a second bearing rear chamber formed on the opposite side of the second bearing to the plunger rear chamber, the second bearing rear chamber performing contraction/enlargement according to a stroke of the shaft, a second bearing oil passage formed through the second bearing to connect the plunger rear chamber and the second bearing rear chamber, and a shaft-penetrating oil passage penetrating the shaft in the direction of the center axis to introduce working oil from the hydraulic equipment to the second bearing rear chamber.

The details as well as other features and advantages of this invention are set forth in the remainder of the specification and are shown in the accompanying drawings.

DESCRIPTION OF THE PREFERRED EMBODIMENTS

Figure 2:
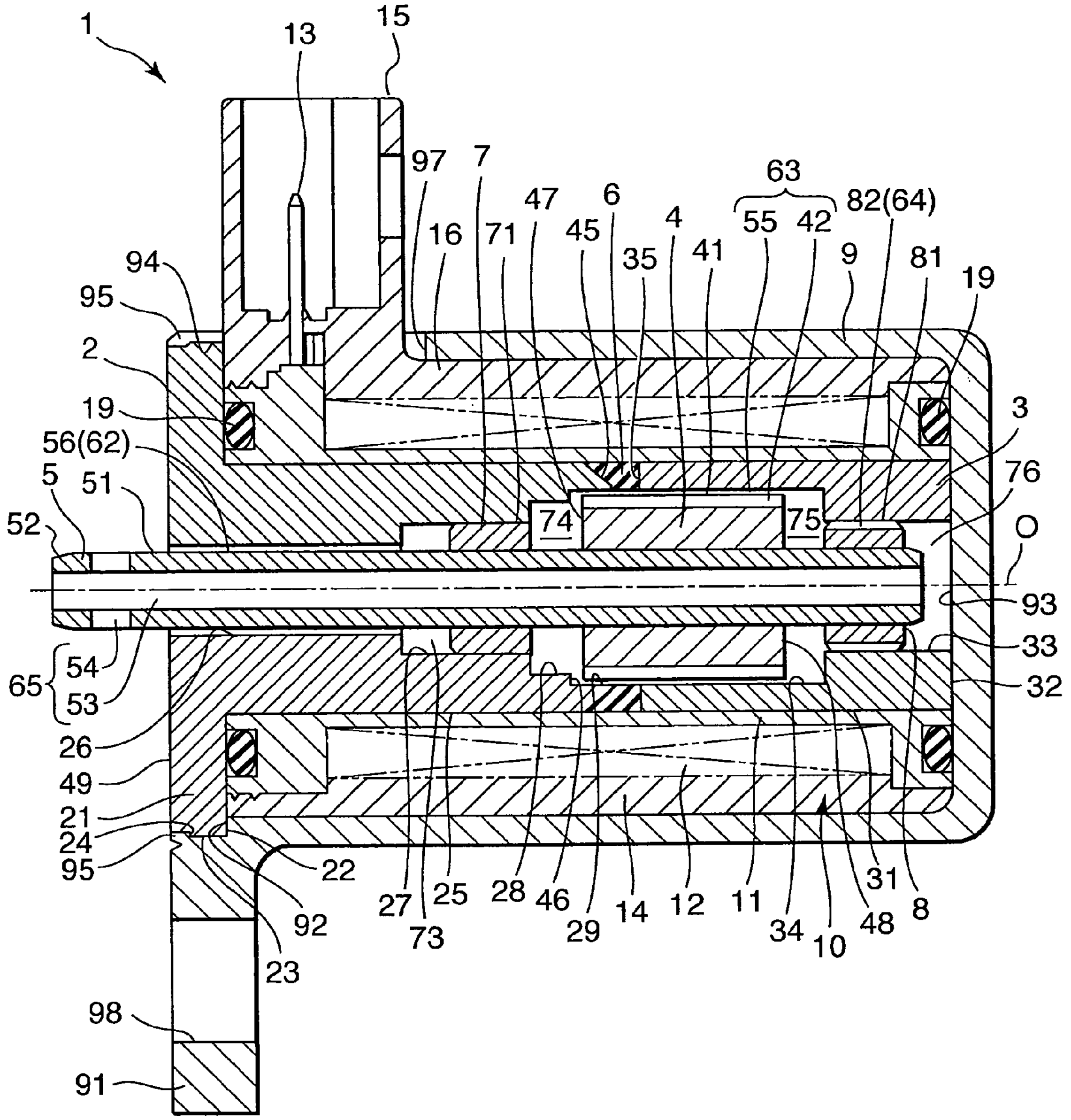
FIG. 2 is a sectional view of the solenoid actuator taken along a line II-O-II in FIG. 1.

Referring to FIG. 2 of the drawings, a solenoid actuator 1 according to this invention is configured to exert a magnetic force on a plunger 4 using a solenoid assembly 10 housed in a case 9, thereby driving a shaft 5 fixed to the plunger 4 in a direction of a center axis O.

Figure 1:
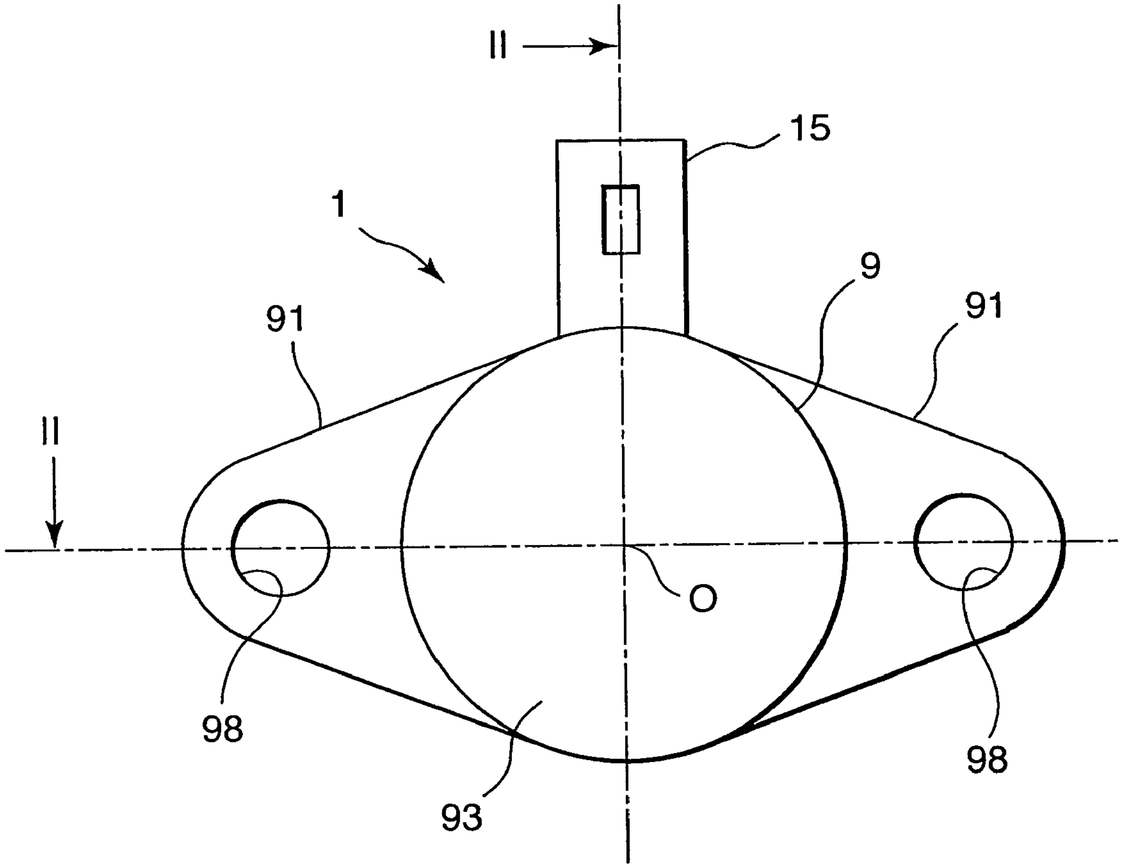
FIG. 1 is a rear view of a solenoid actuator according to this invention.

Referring to FIG. 1, the case 9 is formed in a cylindrical shape. An axial end of the case 9 is closed by a bottom 93 thereof. Another end of the case 9 is open, and fixed to hydraulic equipment such as a valve via a pair of flange parts 91 which extend laterally on both sides of the opening of the case 9. For this purpose, a bolt hole 98 is formed on each of the flange parts 91, and the solenoid actuator 1 is fixed to the hydraulic equipment by bolts penetrating the bolt holes 98.

Referring again to FIG. 2, the solenoid assembly 10 comprises a bobbin 11 formed in a cylindrical shape having a hollow portion with flanges at both ends, a coil 12 wound on the bobbin 11, a pair of terminals 13 electrically connected to either end of the coil 12, and a molding resin 14 that wraps the bobbin 11, the coil 12, and the terminals 13.

The molding resin 14 comprises a wrapping portion 16 which wraps the bobbin 11 and the coil 12, and a connector portion 15 projecting from a tip of the wrapping portion 16 in a radial direction and having an opening. The pair of terminals 13 project radially from the bobbin 11 into the connector portion 15. A connector of a power cable is inserted into the connector portion 15 so as to be connected to the terminals 13 on the inside of the connector portion 15. It is also possible to supply electric power to the coil 12 using a lead wire without providing the pair of terminals 13. The connector portion 15 projects radially from the case 9 via a cutout 97 formed in the case 9.

By supplying electric power to the coil 12, the coil 12 is energized and generates a magnetic flux around the coil 12.

The case 9, a base 2, the plunger 4, and a sleeve 3 function as magnetic path-forming members to transfer the magnetic flux generated by the energized coil 12. All of these members are made of magnetic material.

In FIGS. 1 and 2, the flange parts 91 are formed on an orthogonal plain to the center axis O. The connector portion 15 projects from the case 9 in an orthogonal direction to the center axis O.

The projecting direction of the flange parts 91 and that of the connector portion 15 may be modified depending on the shape of the hydraulic equipment to which the solenoid actuator 1 is fixed. For example, the connector portion 15 may project along the center axis O such that the connector of the power cable is inserted into the connector portion 15 in parallel with the center axis O.

The base 2 and the sleeve 3 are respectively formed in a cylindrical shape. The base 2 and the sleeve 3 are disposed in the case 9 coaxially with the center axis O. The base 2 is disposed on the hydraulic equipment side of the case 9 and the sleeve 3 is disposed on the bottom 93 side of the case 9.

A flange 21 is formed in the base 2 so as to contact the hydraulic equipment. The flange 21 is fitted into a recess 94 formed in a tip of the case 9 so as to form a contact surface that contacts the hydraulic equipment and is continuous with the flange parts 91.

A ring-shaped step portion 92 is formed in the recess 94. The flange 21 is fitted into the recess by seating a rim 22 of the flange 21 on the ring-shaped step portion 92.

A ring-shaped step portion 24 is formed on an outer circumferential surface 23 of the flange 21. On an outer side of the recess 94, a ring-shaped groove is formed in the case 9 near by the flange 21 such that a tip of the case 9 between the recess 94 and the ring-shaped groove functions as a crimp portion 95. The crimp portion 95 is bent inwardly so as to grip the ring-shaped step portion 24, thereby preventing the base 2 from falling out of the case 9.

A tapered surface 45 inclined with respect to the center axis O is formed in a tip of the base 2 facing the sleeve 3. A front end face 35 of the sleeve 3 facing the tapered surface 45 is formed into a ring-shaped plain orthogonal to the center axis O. The base 2 and the sleeve 3 are disposed such that a space is provided between the tapered surface 45 and the front end face 35. The space between the tapered surface 45 and the front end face 35 serves as a magnetic gap with respect to formation of the magnetic field by the energized coil 12. It is also possible to form the front end face 35 into a tapered shape inclined with respect to the center axis O.

The magnetic flux generated inside the energized coil 12 is transferred to the case 9, the base 2, the plunger 4, and the sleeve 3. Since direct transfer of the magnetic flux between the base 2 and the sleeve 3 is interrupted by the magnetic gap formed there-between, the magnetic flux is transferred between the base 2 and the sleeve 3 via the plunger 4. By thus forming the magnetic gap, an adequate magnetic flux density passing through the plunger 4 is ensured.

The shape and the location of the magnetic gap may be set arbitrarily as long as a thrust causing the plunger 4 to stroke along the center axis O is generated by energizing the coil 12.

The magnetic gap is filled with a gap filler 6 made of a non-magnetic material. The gap filler 6 comes into contact with the tapered surface 45 of the base 2 and the front end face 35 of the sleeve 3 without a gap, thereby functioning as a metal seal member shutting off working oil communication between the interior and the exterior of a cylindrical body formed by the base 2, the gap filler 6, and the sleeve 3.

A rear end face 32 of the sleeve 3 contacts the bottom 93 of the case 9 without clearance. An O-ring 19 is gripped between the bobbin 11 of the solenoid assembly 10 and the flange 21 of the base 2. Similarly, another O-ring 19 is gripped between the bobbin 11 and the bottom 93 of the case 9. These O-rings 19 are housed in annular grooves formed respectively in the tips of the bobbin 11.

According to the above construction, a pressure vessel housing the plunger 4 and a part of the shaft 5 is formed by the base 2, the gap filler 6, the sleeve 3 and the case 9, and fitted in the hollow portion of the bobbin 11. Working oil flowing from the hydraulic equipment into the solenoid actuator 1 via a gap 56 between an outer circumferential surface 51 of the shaft 5 and an inner circumferential surface 26 of the base 2 stays in the pressure vessel and does not leak from the pressure vessel to the outside. Since the pressure vessel is tightly closed by the O-rings 19, the sealing function of the gap filler 6 may be omitted. If sealing by the gap filler 6 is not required, the space between the tapered surface 45 of the base 2 and the front end face 35 of the sleeve 3 may be left in the form of an unfilled gap, An outer circumferential surface 31 of the sleeve 3 is fitted into an inner circumferential surface of the bobbin 11. An outer circumferential surface 25 of the base 2 is also fitted into the inner circumferential surface of the bobbin 11.

The shaft 5 projects towards the hydraulic equipment from a front end face 49 of the base 2 located on the opposite side of the base 2 to the tapered surface 45.

The shaft 5 is made of a non-magnetic material. The shaft 5 is supported by a first bearing 7 in the base 2 and a second bearing 8 in the sleeve 3 so as to be free to slide along the center axis O. The plunger 4 is located between the first bearing 7 and the second bearing 8. The first bearing 7 and the second bearing 8 are made of non-magnetic material.

The sleeve 3 comprises a small-diameter inner circumferential surface 33 in the vicinity of the bottom 93 and a large-diameter inner circumferential surface 34 continuous with an inner circumferential surface of the gap filler 6. An outer circumferential surface 81 of the second bearing 8 is supported by the small diameter inner circumferential surface 33.

The base 2 comprises the above-described inner circumferential surface 26 and inner circumferential surface 27-29 having diameters which increase in a step by step fashion towards the tapered surface 45.

The inner circumferential surface 26 having the smallest diameter covers the outer circumferential surface 51 of the shaft 5 with the gap 56 as described above. The inner circumferential surface 27 having the second smallest diameter supports an outer circumferential surface 71 of the first bearing 7. The inner circumferential surface 29 is formed to have an identical diameter to the large diameter inner circumferential surface 34 of the sleeve 3 and the inner circumferential surface of the gap filler 6. The plunger 4 is housed in a cylindrical wall formed by the large-diameter inner circumferential surface 34 of the sleeve, the inner circumferential surface of the gap filler 6, and the inner circumferential surface 29 of the base 2.

The inner circumferential surface 28 having the third smallest diameter is formed between the inner circumferential surface 29 having the largest diameter and the inner circumferential surface 27 having the second smallest diameter in the base 2.

Figure 3:
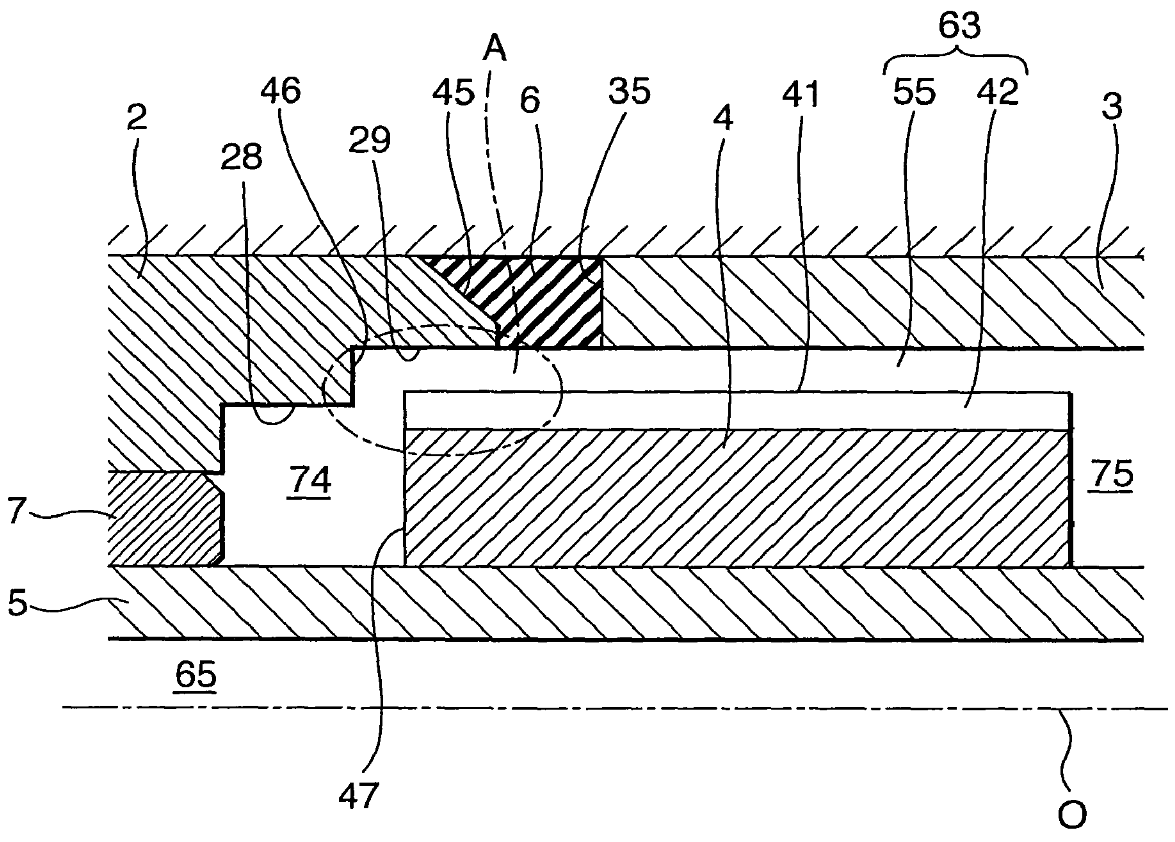
FIG. 3 is an enlarged longitudinal sectional view of a plunger and peripheral parts in the solenoid actuator.

Referring to FIG. 3, a magnetically attracting surface 46 which attracts the plunger 4 by a magnetic force of the energized coil 12 is formed in the base 2. The magnetically attracting surface 46 corresponds to a ring-shaped step portion formed between the inner circumferential surface 28 and the inner circumferential surface 29. The magnetically attracting surface 46 forms an orthogonal plain to the center axis O of the shaft 5. The diameter of the inner circumferential surface 28 is set to be smaller than a diameter of the plunger 4 such that the magnetically attracting surface 46 faces a front end face 47 of the plunger 4.

Referring again to FIG. 2, in the above-described pressure vessel formed by the base 2, the gap filler 6, the sleeve 3, and the case 9, a first bearing front chamber 73, a plunger front chamber 74, a plunger rear chamber 75, and a second bearing rear chamber 76 are formed facing the shaft 5 and/or the plunger 4. All of these chambers 73-76 are filled with working oil led from the hydraulic equipment. With respect to the name of these chambers, "front" denotes a hydraulic equipment side and "rear" denotes an opposite side.

The first bearing front chamber 73 is formed in the inner circumferential surface 27 in front of the first bearing 7. The first bearing front chamber 73 is connected to the gap 56. The gap 56 forms a base oil passage 62 which connects the hydraulic equipment and the first bearing front chamber 73. It is possible to design the base oil passage 62 to store contaminants by making the inner circumferential surface 26 of the base 2 delimiting the gap 56 have a larger diameter such that the base oil passage 62 has a larger cross-sectional area.

The plunger front chamber 74 is formed between the first bearing 7 and the front end face 47 of the plunger 4. The plunger front chamber 74 corresponds to the interior of the inner circumferential surface 28 and a front portion of the inner circumferential surface 29. The first bearing 7 does not have an oil passage, and therefore working oil communication between the first bearing front chamber 73 and the plunger front chamber 74 is interrupted by the first bearing 7.

The plunger rear chamber 75 is formed between a rear end face 48 of the plunger 4 and the second bearing 8 in the interior of the inner circumferential surface 29.

The plunger front chamber 74 and the plunger rear chamber 75 are separated by the plunger 4. An annular gap 55 is provided between the inner circumferential surface 29 and an outer circumferential surface 41 of the plunger 4 so that the plunger 4 is not caused to contact the sleeve 3 by the magnetic force. The gap 55 forms a plunger exterior oil passage 63 which connects the plunger front chamber 74 and the plunger rear chamber 75.

A plurality of grooves 42 are formed in the outer circumferential surface 41 of the plunger 4 in parallel with the center axis O as a part of the plunger exterior oil passage 63. Working oil flows between the plunger front chamber 74 and the plunger rear chamber 75 via the plunger exterior oil passage 63 thus constructed.

By forming the plurality of grooves 42 in the outer circumferential surface 41 of the plunger 4, a width of the gap 55 can be narrowed without decreasing the flow cross-sectional area of the working oil. Narrowing the gap 55 improves a driving efficiency of the plunger 4.

The second bearing rear chamber 76 is formed between the second bearing 8 and the bottom 93 of the case 9 in the interior of the inner circumferential surface 33.

A plurality of grooves 82 are formed in the outer circumferential surface 81 of the second bearing 8 in parallel with the center axis O. The grooves 82 form a second bearing oil passage 64 connecting the plunger rear chamber 75 and the second bearing rear chamber 76.

A longitudinal through-hole 53 penetrates the shaft 5 in a direction of the center axis O. A lateral through-hole 54 which is orthogonal to the center axis O penetrates a projecting portion 52 of the shaft 5 projecting from the base 2. The longitudinal through-hole 53 and the lateral through-hole 54 form a shaft-penetrating oil passage 65 connecting the hydraulic equipment to the second bearing rear chamber 76.

An opening of the longitudinal through-hole 53 formed in the projecting portion 52 is closed by the hydraulic equipment when the solenoid actuator 1 is attached to the hydraulic equipment. The lateral through-hole 54 is however exposed to the interior of the hydraulic equipment when the solenoid actuator 1 is attached to the hydraulic equipment.

When the solenoid actuator 1 is attached to the hydraulic equipment, the solenoid actuator 1 is filled with working oil in the following manner.

- working oil from the hydraulic equipment fills the first bearing front chamber 73 via the base oil passage 62;
- working oil from the hydraulic equipment fills the second bearing rear chamber 76 via the shaft-penetrating oil passage 65;
- working oil in the second bearing rear chamber 76 fills the plunger rear chamber 75 via the second bearing oil passage 64; and
- working oil in the plunger rear chamber 75 fills the plunger front chamber 74 via the plunger exterior oil passage 63.

The solenoid actuator 1 drives the plunger 4 by the magnetic force generated by the coil 12 such that the shaft 5 fixed to the plunger 4 is driven axially.

When the coil 12 is not energized, the shaft 5 is kept in a retreated position by a reaction force of the hydraulic equipment. The retreated position herein corresponds to an initial position of the shaft 5.

When the coil 12 is energized, the plunger 4 is attracted towards the magnetically attracting surface 46 by an effect of the magnetic field formed in the interior of the coil 12. The thrust generated by the magnetic field causes the plunger 4 to move towards the magnetically attracting surface 46, thereby driving the shaft 5 forward to operate the hydraulic equipment. The operation of the hydraulic equipment denotes, for example, opening/closing of a valve. FIG. 2 shows a state where the shaft 5 has stroked forward slightly from the initial position.

When the plunger 4 strokes forward together with the shaft 5, working oil corresponding to the volume of the shaft 5 which withdraws from the second bearing rear chamber 76 flows into the second bearing rear chamber 76 from the hydraulic equipment via the shaft-penetrating oil passage 65.

Further, working oil corresponding to the stroke volume of the plunger 4 moves from the contracting plunger front chamber 74 to the expanding plunger rear chamber 75 via the plunger exterior oil passage 63.

When energization of the coil 12 is stopped, the shaft 5 strokes rearward due to the reaction force of the hydraulic equipment, which is the opposite way to the direction in which the shaft 5 is driven by the energized coil 12.

As the shaft 5 strokes rearward, working oil corresponding to the invasion volume of the shaft 5 into the second bearing rear chamber 76 is expelled from the second bearing rear chamber 76 to the hydraulic equipment via the shaft-penetrating oil passage 65.

Further, as the plunger 4 strokes rearward, working oil corresponding to the stroke volume of the plunger 4 moves from the contracting plunger rear chamber 75 to the expanding plunger front chamber 74 via the plunger exterior oil passage 63.

It should be noted that working oil led to the solenoid actuator 1 from the hydraulic equipment contains contaminants such as abrasion powder produced in the hydraulic equipment. Magnetic material such as iron powder contained in the working oil tends to be deposited on a strong magnetic field portion A shown in FIG. 3, where the magnetic flux between the base 2 and the plunger 4 concentrates, when the working oil flows into the plunger front chamber 74 and the plunger rear chamber 75 of the solenoid actuator 1. If a large amount of contaminant is deposited on a surface of the base 2 and the plunger 4 which form the strong magnetic field portion A, the following inconveniences will arise.

the hysteresis of the solenoid actuator 1 increases due to a variation in the thrust generated by the energized coil 12; and the sliding resistance of the plunger 4 increases and the stroke length of the plunger 4 shortens.

To prevent these inconveniences from arising, this invention interrupts working oil communication between the first bearing front chamber 73 and the plunger front chamber 74 using the first bearing 7 while leading working oil from the hydraulic equipment into the plunger front chamber 74 via the shaft-penetrating oil passage 65, the second bearing rear chamber 76, the second bearing oil passage 64, the plunger rear chamber 75, and the plunger exterior oil passage 63.

According to this arrangement of the working oil path, the contaminant in the working oil has to travel along a long path before reaching the strong magnetic field portion A formed around the plunger 4. As a result, contaminant deposits on the strong magnetic field portion A of the surface of the base 2 and the plunger 4, which are made of magnetic material, are suppressed. Contaminant deposits on the strong magnetic field portion A are preferably suppressed to prevent a malfunction of the solenoid actuator 1 caused by the contaminant deposits, The second bearing rear chamber 76 and the plunger rear chamber 75 which undertake expansion/contraction in response to the stroke of the plunger 4 are connected via the second bearing oil passage 64. Pressure variation in the hydraulic equipment is transmitted to the second bearing rear chamber 76, and then transmitted to the plunger rear chamber 75 via the second bearing oil passage 64.

With this pressure transmitting structure, a pressure difference between the second bearing rear chamber 76 and the plunger rear chamber 75 is unlikely to occur. Accordingly, a shift of the second bearing 8 due to a difference in pressures acting on both sides thereof is prevented from occurring.

The annular gap 55 provided around the outer circumferential surface 41 of the plunger 4 as the plunger exterior oil passage 63 prevents the plunger 4 driven by the magnetic force from contacting the sleeve 3. The plurality of grooves 42 formed in the outer circumferential surface 41 of the plunger 4 suppresses the flow rate of the working oil around the plunger 4 from increasing when the plunger 4 strokes, thereby decreasing viscous resistance which the working oil exerts on the stroke of the plunger 4 and enabling a high-speed stroke of the plunger 4. As a result, the response of the solenoid actuator 1 is increased. By causing the plunger 4 to stroke at a high speed, removal of contaminant deposited on the plunger 4 is also promoted and an environment is realized in which a malfunction of the solenoid actuator 1 due to a contaminant deposit is unlikely to occur.

Figure 4:
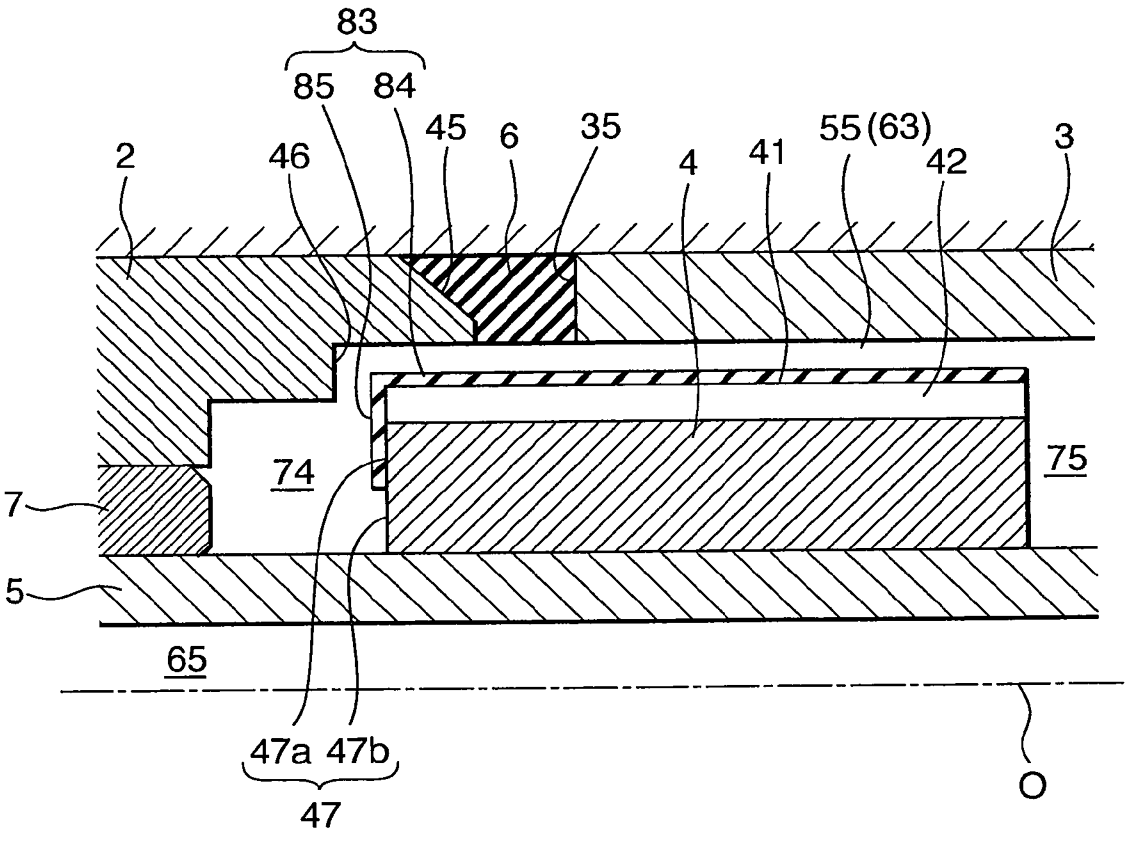
FIG. 4 is similar to FIG. 3, but shows a second embodiment of this invention.

Next, referring to FIGS. 4-6, other embodiments of this invention will be described.

All these embodiments are provided with an identical pressure transmitting structure to the first embodiment shown in FIGS. 1-3 to prevent a difference in the pressures acting on the second bearing 8. Further, these embodiments are provided with special constructions to prevent contaminant from invading the gap 55 from the plunger front chamber 74 or the plunger rear chamber 75.

First, referring to FIG. 4, a second embodiment of this invention will be described.

Components of this embodiment that have the same construction as those of the first embodiment shown in FIGS. 1-3 are given identical component numbers, and their description is herein omitted.

A solenoid actuator 1 according to this embodiment comprises a cylindrical cover 83 made of non-magnetic material to cover the outer circumferential surface 41 of the plunger 4. The annular gap 55 is formed between a cylindrical wall surface formed by the inner circumferential surface 34 of the sleeve 3, the inner circumferential surface of the gap filler 6 and the inner circumferential surface 29 of the base 2, and the cover 83. The annular gap 55 forms the plunger exterior oil passage 63 connecting the plunger front chamber 74 to the plunger rear chamber 75.

The cover 83 comprises a cylindrical portion 84 covering the outer circumferential surface 41 of the plunger 4 and a front end portion 85 which is bent inward from a front tip of the cylindrical portion 84.

The front end portion 85 contacts the front end face 47 of the plunger 4 closely. By forming an opening in the front end portion 85 to communicate with the grooves 42 on the outer circumferential surface 41 of the plunger 4, the grooves 42 can be used as a part of the plunger exterior oil passage 63 as in the case of the first embodiment.

The front end face 47 of the plunger 4 is divided into an outer part 47*a* covered by the front end portion 85 of the cover 83 and an exposed part 47*b* exposed to the plunger front chamber 74.

According to this embodiment, since the outer circumferential surface 41 of the plunger 4 is covered by the cover 83 made of non-magnetic material, contaminant deposits on the outer circumferential surface 41 of the plunger 4 can be suppressed.

Further, since the plunger exterior oil passage 63 is formed on the outside of the cover 83, viscous resistance which the working oil exerts on the displacement of the plunger 4 is reduced such that a high-speed stroke of the plunger 4 is enabled. As a result, the response of the solenoid actuator 1 is improved. The high-speed stroke of the plunger 4 helps in removing contaminant deposited on the plunger 4. An operation failure of the solenoid actuator 1 is therefore not likely to occur.

Since the outer part 47*a* of the front end face 47 of the plunger 4 is covered by the front end portion 85 of the cover 83 made of a non-magnetic material, contaminant does not adhere to the outer part 47*a*. Contaminant may adhere to the exposed part 47*b*, but since this part corresponds to an inner circumference of the front end face 47, the contaminant adhered to this part does not greatly affect the thrusting force of the coil 12. A stable operation of the solenoid actuator 1 is thereby ensured.

Figure 5:
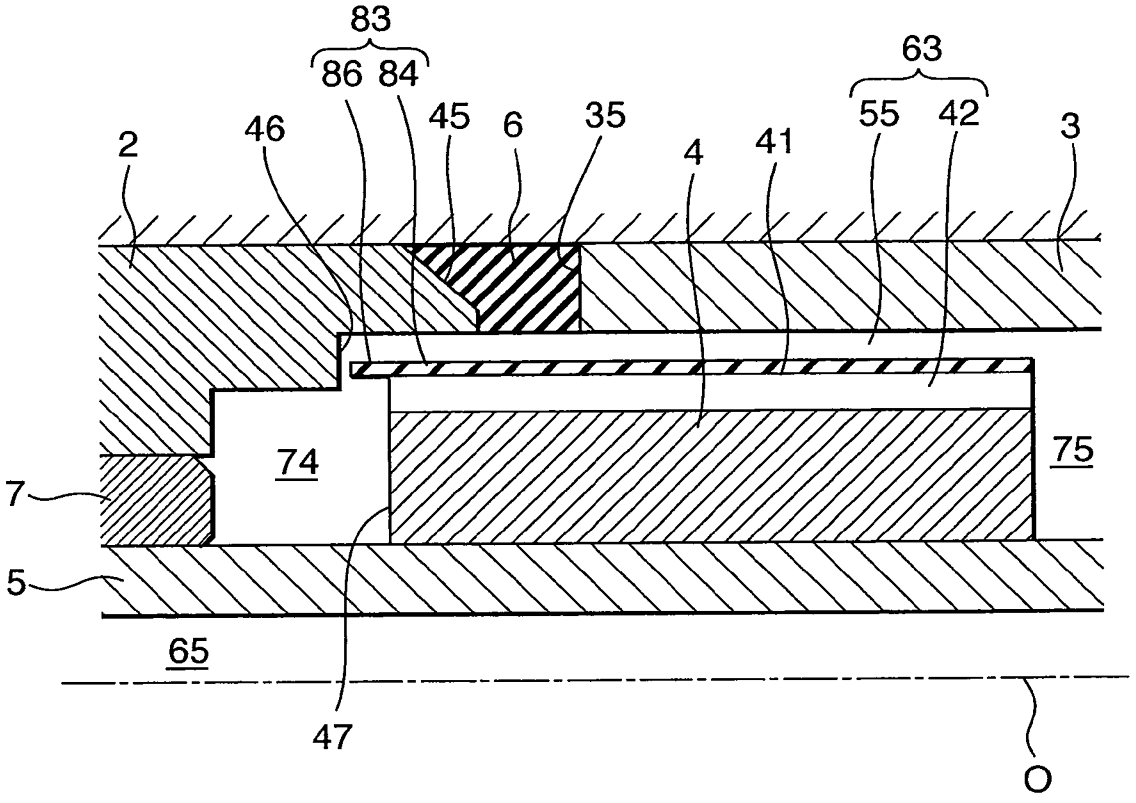
FIG. 5 is similar to FIG. 3, but shows a third embodiment of this invention.

Referring to FIG. 5, a third embodiment of this invention will be described.

Components of this embodiment that have the same construction as those of the first and the second embodiments are given identical component numbers, and their description is herein omitted.

According to this embodiment, the cover 83 comprises a projecting portion 86 which is continuous with the cylindrical portion 84 and projects into the plunger front chamber 74 instead of the front end portion 85 of the second embodiment covering the outer part 47*a* of the front end face 47 of the plunger 4. The diameter of the projecting portion 86 is identical to that of the cylindrical portion 84.

The front end face 47 of the plunger 4 is exposed to the plunger front chamber 74 on the inner side of the projecting portion 86. The projecting portion 86 prevents contaminant adhered to the front end face 47 of the plunger 4 from invading the plunger exterior oil passage 63 on the outside of the cylindrical portion 84. As a result, the solenoid actuator 1 can be operated stably for a long time.

Figure 6:
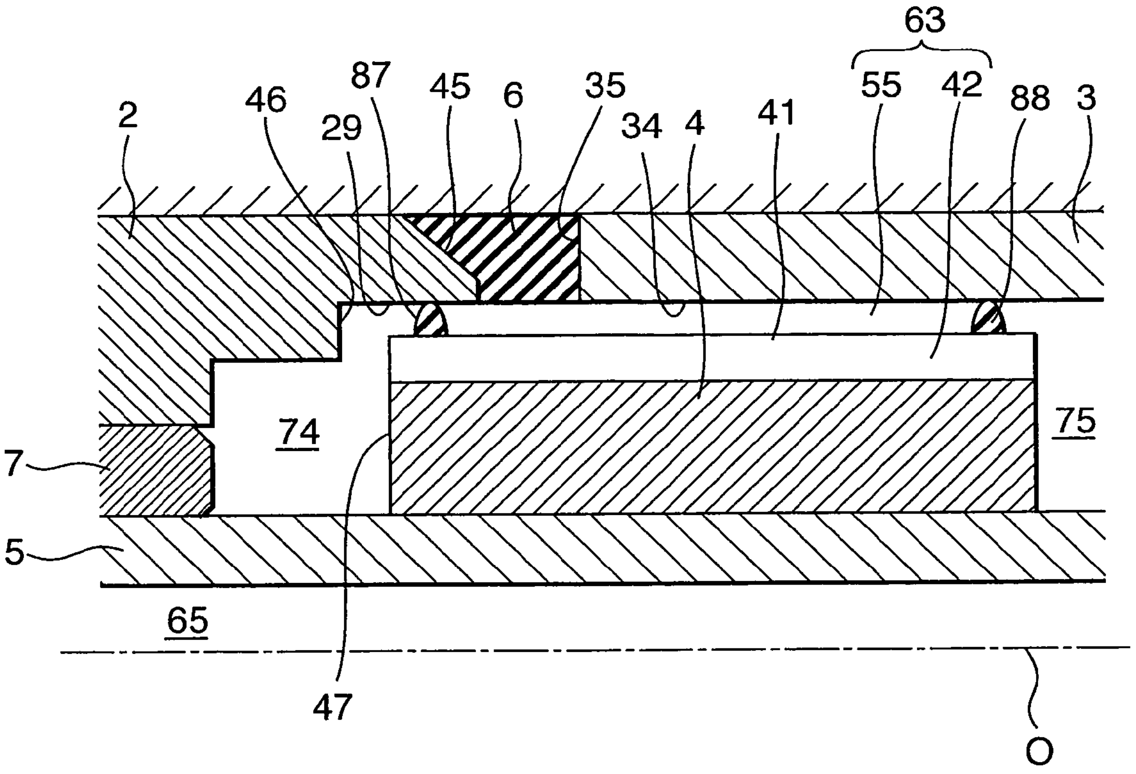
FIG. 6 is similar to FIG. 3, but shows a fourth embodiment of this invention.

Referring to FIG. 6, a fourth embodiment of this invention will be described.

Components of this embodiment that have the same construction as those of any of the first to third embodiments are given identical component numbers, and their description is herein omitted.

According to this embodiment, a first scraper 87 and a second scraper 88 which project radially from the outer circumferential surface 41 of the plunger 4, respectively, are provided instead of the cover 83 of the second and third embodiments. The first scraper 87 and the second scraper 88 are formed in an annular shape and fixed to the outer circumferential surface 41 of the plunger 4. The first scraper 87 and the second scraper 88 have a lip-shaped cross-section. A tip of the first scraper 87 slides on the inner circumferential surface 29 of the base 2 and a tip of the second scraper 88 slides on the inner circumferential surface 34 of the sleeve 3.

The first scraper 87 and the second scraper 88 are made of a non-magnetic material. They are preferably made of a plastic material such as a resin.

The first scraper 87 prevents contaminant in the plunger front chamber 74 from invading the annular gap 55 on the outside of the plunger 4. The second scraper 88 prevents contaminant in the plunger rear chamber 75 from invading the annular gap 55 on the outside of the plunger 4. According to this embodiment, therefore, contaminant is prevented from depositing on the strong magnetic field portion A.

Further, the first scraper 87 slides on the inner circumferential surface 29 of the base 2 and the second scraper 88 slides on the inner circumferential surface 34 of the sleeve 3. Contaminant adhered to the inner circumferential surface 29 of the base 2 and contaminant adhered to the inner circumferential surface 34 of the sleeve 3 are therefore scraped off by the first scraper 87 and the second scraper 88. Contaminant deposits on the inner circumferential surface 29 of the base 2 and on the inner circumferential surface 34 of the sleeve 3 are thereby prevented.

According to this embodiment, therefore, the solenoid actuator 1 can be operated stably for a long time.

The contents of Tokugan 2008-285371 with a filing date of Nov. 6, 2009 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

The embodiments of this invention in which an exclusive property or privilege is claimed are defined as follows:

What is claimed is:

1. A solenoid actuator for attaching to a hydraulic equipment, comprising:

a shaft for connecting to the hydraulic equipment, the shaft having a center axis;

a plunger made of a magnetic material and fixed to the shaft;

a coil which magnetically chives the plunger in a direction of the center axis;

a first bearing and a second bearing which support the shaft, the first bearing and the second bearing being located on both sides of the plunger in the direction of the center axis such that the first bearing is nearer to the hydraulic equipment than the second bearing;

a plunger-front chamber formed between the first bearing and the plunger;

a plunger-rear chamber formed between the plunger and the second bearing;

a plunger-exterior oil passage formed on the outside of the plunger to connect the plunger-front chamber and the plunger-rear chamber;

a second-bearing-rear chamber formed on the opposite side of the second bearing to the plunger-rear chamber, the second-bearing-rear chamber performing contraction/enlargement according to a stroke of the shaft;

a second-bearing oil passage formed through the second bearing to connect the plunger-rear chamber and the second-bearing-rear chamber; and a shaft-penetrating oil passage penetrating the shaft in the direction of the center axis to introduce working oil from the hydraulic equipment to the second-bearing-rear chamber.

2. The solenoid actuator as defined in claim 1, further comprising a first-bearing-front chamber formed on the opposite side of the first bearing to the plunger-front chamber, and a base oil passage formed along an outer circumference of the shaft in the direction of the center axis to introduce working oil from the hydraulic equipment to the first-bearing-front chamber.

3. The solenoid actuator as defined in claim 2, further comprising a bobbin which supports the coil, the bobbin having a hollow portion, and a pressure vessel fitted into the hollow portion of the bobbin, wherein the plunger, the first bearing, and the second bearing are housed in the pressure vessel, and the first bearing-front chamber, the plunger-front chamber, the plunger-rear chamber, the second-bearing-rear chamber, the base oil passage, the plunger-exterior oil passage, and the second-bearing oil passage are formed on the exterior of the shaft in the pressure vessel.

4. The solenoid actuator as defined in claim 3, further comprising a case having a bottom and housing the pressure vessel, the bobbin, and the coil, wherein the pressure vessel comprises a cylindrical sleeve that is made of a magnetic material and contacts the bottom, a base made of a magnetic material in a cylindrical shape and disposed in series with the sleeve in the direction of the center axis, and a gap filler made of a non-magnetic material and interposed between the sleeve and the base.

5. The solenoid actuator as defined in claim 3, wherein a gap is formed between an outer circumferential surface of the plunger and an inner circumferential surface of the pressure vessel so as to serve as the plunger-exterior oil passage.

6. The solenoid actuator as defined in claim 3, wherein a groove is formed on an outer circumferential surface of the second bearing in the direction of the center axis so as to serve as the second-bearing oil passage.

7. The solenoid actuator as defined in claim 3, further comprising a cover made of a non-magnetic material to cover the plunger, wherein the plunger-exterior oil passage is formed on the outside of the cover.

8. The solenoid actuator as defined in claim 7, wherein the plunger comprises a front end face facing the plunger-front chamber, the cover comprises a front end portion which overlaps an outer part of the front end face while leaving an exposed part of the front end face located on the inner side of the outer part to be exposed to the plunger-front chamber.

9. The solenoid actuator as defined in claim 7, wherein the cover comprises a cylindrical portion which covers an outer circumferential surface of the plunger and a projecting portion which projects from the cylindrical portion into the plunger-front chamber.

10. The solenoid actuator as defined in claim 3, further comprising a pair of scrapers made of a non-magnetic material and fixed to an outer circumferential surface of the plunger, the scrapers having a tip which slides on an inner circumferential surface of the pressure vessel.

* * * * *